US006889806B2

(12) United States Patent
Handa et al.

(10) Patent No.: US 6,889,806 B2
(45) Date of Patent: May 10, 2005

(54) VEHICULAR TWO-WHEEL DRIVE AND FOUR-WHEEL DRIVE SWITCHING SYSTEM

(75) Inventors: Akio Handa, Saitama (JP); Noriaki Takano, Saitama (JP); Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/690,614

(22) Filed: Oct. 23, 2003

(65) Prior Publication Data

US 2004/0097321 A1 May 20, 2004

Related U.S. Application Data

(62) Division of application No. 10/060,227, filed on Feb. 1, 2002, now Pat. No. 6,698,563.

(30) Foreign Application Priority Data

| Feb. 1, 2001 | (JP) | 2001-025669 |
| Feb. 1, 2001 | (JP) | 2001-025670 |
| Oct. 10, 2001 | (JP) | 2001-312768 |

(51) Int. Cl.[7] .............................................. B60K 23/08
(52) U.S. Cl. ........................................ 192/35; 192/44
(58) Field of Search ..................... 192/35, 44; 180/233, 180/248; 475/220

(56) References Cited

U.S. PATENT DOCUMENTS

| 3,300,002 | A | | 1/1967 | Roper | |
| 4,076,108 | A | | 2/1978 | Fogelberg | |
| 4,284,183 | A | | 8/1981 | Brisabois et al. | |
| 4,867,260 | A | | 9/1989 | Cameron et al. | |
| 4,938,306 | A | * | 7/1990 | Sumiyoshi et al. | 180/233 |
| 5,148,903 | A | * | 9/1992 | Kobayashi et al. | 192/85 AA |
| 5,195,604 | A | * | 3/1993 | Brockett et al. | 180/248 |
| 6,318,532 | B1 | * | 11/2001 | Gassmann | 192/35 |
| 6,530,447 | B2 | | 3/2003 | Seki et al. | |
| 6,626,787 | B2 | * | 9/2003 | Porter | 475/221 |

* cited by examiner

*Primary Examiner*—Saul Rodriguez
(74) *Attorney, Agent, or Firm*—Birch, Stewart, Kolasch & Birch, LLP

(57) ABSTRACT

To provide a vehicular two-wheel drive and four-wheel drive switching system the configuration of which is simple and which can be built with minor changes to the existing configuration. The switching system hardly generates any noise and can be individually lubricated in a state separated from the other actuating parts. A vehicular two-wheel drive and four-wheel drive switching system according to the present invention is provided with an outer ring connected to a driving shaft and an inner ring connected to a driven shaft. A plurality of engaging/disengaging members are provided for connecting or disconnecting the shafts by being connected or disconnected to/from the respective opposite surfaces. A switching mechanism is provided for selectively positioning the drive shaft and the driven shaft in a position in which they are connected and in a position in which they are disconnected. The outer ring is axially divided into a first outer ring and a second outer ring, they are connected via a spline provided at each end in a state in which relative turning is contained and the driving shaft is connected to the second outer ring via a spline in a state in which relative turning is contained.

4 Claims, 9 Drawing Sheets

ELECTROMAGNETIC CLUTCH OFF

ELECTROMAGNETIC CLUTCH ON

VEHICULAR TWO-WHEEL DRIVE AND FOUR-WHEEL DRIVE SWITCHING SYSTEM

CROSS-REFERENCE TO RELATED APPLICATIONS

This application is a Divisional Application of U.S. Pat. No. 6,698,563 B2, issued on Mar. 2, 2004 (Application Ser. No. No. 10/060,227, filed on Feb. 1, 2002, and for which priority is claimed under 35 U.S.C. § 120; and the present application claims priority under 35 USC 119 to Japanese Patent Application Nos. 2001-025669 filed on Feb. 1, 2001; 2001-025670 filed on Feb. 1, 2001 and 2001-312768 filed on Oct. 10, 2001 the entire contents thereof are hereby incorporated by reference.

BACKGROUND OF THE INVENTION

1. Field of the Invention

The present invention relates to a vehicular two-wheel drive and four-wheel drive switching system.

2. Description of Background Art

Heretofore, a vehicle is known in which two-wheel drive can be switched to four-wheel drive.

FIGS. 4 and 5 show an example of the above-mentioned vehicle. A vehicle 1 is substantially composed of a body frame 3 with an engine 2 mounted in the center. A front wheel 4 and a rear wheel 5 are arranged on both sides of the front and the rear of the body frame 3. A steering handlebar 6 is arranged above the front of the body frame 3 for steering the front wheel 4. A fuel tank 7 is located above the engine 2 and attached to the body frame 3. A seat 8 is attached to the rear of the fuel tank 7.

As shown in FIG. 5, each front wheel 4 is supported by a suspension system 9 that is provided on both sides of the front of the body frame 3 so that each front wheel can be vertically moved. Each rear wheel 5 is supported by a suspension system 10 that is provided on both sides of the rear of the body frame 3 so that each rear wheel can be vertically moved.

A final reduction gear for front wheels 13 and a final reduction gear for rear wheels 14, respectively, connected to the engine 2 via propeller shafts 11 and 12 are provided in the center of the front and the center of the rear, respectively, of the body frame 3. The right and left front wheels 4 and the right and left rear wheels 5 are respectively connected to the final reduction gear for the front wheels 13 and the final reduction gear for the rear wheels 14.

A two-wheel drive and four-wheel drive switching system for switching a rear-wheel drive to a four-wheel drive by disconnecting the motive power to be transmitted to the front wheels 4 or transmitting motive power to the front wheels 4 is provided between the final reduction gear for the front wheels 13 and the propeller shaft 11, for example. In the alternative, the two-wheel drive and four-wheel drive switching system is provided between the rear propeller shaft 12 and the final reduction gear for the rear wheels 14, and the front-wheel drive and the four-wheel drive may be also switched.

The switching of the type of drive is suitably performed by a driver according to the state of the road surface and the type of desired traveling.

For example, a two-wheel drive and four-wheel drive switching system having the structure shown in FIG. 6 is proposed.

The two-wheel drive and four-wheel drive switching system 15 in FIG. 6 is composed of two input shaft components 16a and 16b formed by axially dividing the input shaft 16 of the final reduction gear for the front wheels 13 into two and matched on the same axis and a switching unit 17 for engaging or disengaging thereof.

To describe in detail, a cylindrical positioning protrusion 18 is provided in the center of the end face of the input shaft component 16a located on the side of the final reduction gear for the front wheels 13. A positioning concave portion 19 is provided into which the positioning protrusion 18 is fitted so that the positioning protrusion can be turned. The positioning concave portion 19 is formed in the center of the end face of the input shaft component 16b. Both input shaft components 16a and 16b are positioned on the same axis and are connected so that they can be relatively turned by matching both input shaft components 16a and 16b so that the positioning protrusion 18 and the positioning concave portion 19 fit together.

Splines S1 and S2 are formed on the respective peripheral faces of the respective matched parts of both input shaft components 16a and 16b and the switching unit 17 is provided so that it surrounds the matched parts.

This switching unit 17 includes a switching ring 20 on the inner surface of which a spline is formed, which is fitted to the respective matched parts of both input shaft components 16a and 16b so that the switching ring can be slid. The spline is engaged with or is disengaged from the respective splines S1 and S2. A drive mechanism 21 formed by a solenoid is provided for selectively moving the switching ring 20 to a position in which the spline is engaged with only one input shaft component 16a or a position in which the spline is simultaneously engaged with the splines S1 and S2 of both input shaft components 16a and 16b by sliding the switching ring 20 in the axial direction of both input shaft components 16a and 16b.

The two-wheel drive and four-wheel drive switching system 15 configured as described above is turned to a two-wheel drive in which only the rear wheels are driven by moving the switching ring 20 in one direction by the drive mechanism 21, engaging it with only one input shaft component 16a and disconnecting the transmission of the driving force to the front wheels 4. The switching system 15 is turned to a four-wheel drive in which driving force is transmitted to the front wheels 4 and the front wheels 4 and the rear wheels 5 are simultaneously driven by engaging the switching ring 20 with the other input shaft component 16b in a state in which the switching ring is engaged with one input shaft component 16a by sliding the switching ring 20 and hereby, engaging both input shaft components 16a and 16b.

The two-wheel drive/four-wheel drive mode shifting device 15 in such a construction takes the two-wheel drive mode in which only rear wheels are driven by moving the switching ring 20 in one direction by the drive mechanism 21 into engagement only with one of the input shaft components 16a to block distribution of drive power to the front wheel 4, and takes the four-wheel drive mode in which the front wheels 4 and the rear wheels 5 are simultaneously driven by sliding the shift ring 20 into engagement with the other input shaft components 16b while being engaged with one of the input shaft components 16a, whereby both of the input shaft components 16a, 16b are connected and thus drive power is distributed also to the front wheel 4.

However, such a conventional type two-wheel drive and four-wheel drive switching system 15 has the following problems that require improvement.

That is, there is a problem that when there is a difference in the peripheral speed between the front wheel 4 and the rear wheel 5 in switching drive types, engagement between the switching ring 20 and the input shaft component 16b does not function and switching may be disabled.

Even if switching is completed, there is also a problem that the splines collide in switching which results in the generation of noise.

To solve such problems, a mechanism for synchronizing (aligning) the spline of the switching ring 20 and the spline of the input shaft component 16b is required. The structure becomes complex when the two-wheel drive and the four-wheel drive switching system 15 is built. The new mechanism that is required is greatly changed from the existing structure.

In the meantime, there is a problem wherein the propeller shaft of the engine 2 connected to the input shaft component 16b has a different form when the two-wheel drive and four-wheel drive switching system 15 is mounted on a different vehicle from the vehicle 1. The form of the two-wheel drive and four-wheel drive switching system 15 also is required to be changed.

SUMMARY AND OBJECTS OF THE INVENTION

The invention is made to solve such conventional problems and to provide a vehicular two-wheel drive and four-wheel drive switching system which hardly generates any noise and which can be applied to a different type of vehicle with a small structural change.

The problem is that when switching the drive mode, there is a case where the switching ring 20 and the input shaft components 16b cannot be engaged successfully at the slightest difference in peripheral velocity between the front wheel 4 and the rear wheel 5, and thus the mode cannot be switched.

On the other hand, though both of the two-wheel drive/four-wheel drive mode shifting device 15 and the front wheel final decelerator 13 must be lubricated, the two-wheel drive/four-wheel drive mode shifting device 15 is independently lubricated in the related art.

However, in such a lubricating method, since the two-wheel drive/four-wheel drive mode shifting device 15 and the front wheel final decelerator 13 are separately lubricated, lubricant must be provided separately, which leads to an increase in the cost of the vehicle.

With such problems in the related art in view, it is an object of the present invention to provide a two-wheel drive/four-wheel drive mode shifting device for vehicles of a simple construction, which can be built-in with a least amount of modification of the existing construction, generates little noise, and has a simplified lubricating construction at the operating portion.

A vehicular two-wheel drive and four-wheel drive switching system according to the present invention is provided with a switching unit provided on either side of the power transmission mechanisms, respectively, provided between an engine and front wheels and between the engine and rear wheels for transmitting power in the power transmission mechanism or disengaging the transmission of power. A driving shaft is connected to the drive side. A driven shaft is provided so that the driven shaft can be relatively turned for the driving shaft. An outer ring is connected to the driving shaft in a state in which relative turning is contained. An inner ring is inserted into the outer ring and connected to the driven shaft in a state in which relative turning is contained. A plurality of engaging/disengaging members are provided in a clearance between the outer ring and the inner ring for engaging or disengaging the outer ring and the inner ring by fitting or disengaging the plurality of engaging/disengaging members to/from the respective opposite surfaces. A switching mechanism is provided for selectively positioning the engaging/disengaging members in a position in which the driving shaft and the driven shaft are connected and in a position in which they are disconnected so as to achieve the above-mentioned object. The outer ring is axially divided into two to be a first outer ring and a second outer ring. The first outer ring and the second outer ring are connected via splines provided at respective ends in a state in which relative turning is contained. The driving shaft is connected to the second outer ring via the spline in a state in which relative turning is contained.

A vehicular two-wheel drive and four-wheel drive switching system according to the present invention includes a fitting member provided between the first outer ring and the second outer ring, respectively, that is fitted to splines for engaging the first outer ring and the second outer ring for containing the axial relative movement of the first outer ring and the second outer ring.

A vehicular two-wheel drive and four-wheel drive switching system according to the present invention includes a sealing ring that is provided between the first outer ring and the second outer ring, respectively.

A vehicular two-wheel drive and four-wheel drive switching system according to the present invention includes a positioning part to which the end of the driving shaft that is touched is formed in the center of the second outer ring.

In order to achieve the above-described object, the two-wheel drive/four-wheel drive mode switching device for vehicles according to the present invention includes a switching unit provided on one of the power transmission mechanisms provided between the engine and the front wheel and between the engine and the rear wheel for connecting and disconnecting transmission of power in the power transmission mechanism, respectively. The shifting unit includes a drive shaft connected to the driving means. A driven shaft is fitted to the drive shaft with an annular clearance defined therebetween. A plurality of engaging/disengaging members are interposed in the clearance defined between the drive shaft and the driven shaft for connecting and disconnecting the drive shaft and the driven shaft by being engaged and disengaged with these opposed surfaces. A switching mechanism is provided for selectively placing the engaging/disengaging members between the position at which the drive shaft and the driven shaft are connected and the position at which the same are disconnected. A casing is provided for enclosing these components. The casing is mounted on the final decelerator connected to the driven shaft. A communicating section that brings the casing and the final decelerator into communication with each other is formed between them. An oil seal is provided on the opposite side of the driven shaft from the portion formed with a communicating section.

The two-wheel drive/four-wheel drive mode shifting device for vehicles according to the present invention includes an oil filter that is formed at the communicating section between the casing and the final decelerator.

The two-wheel drive/four-wheel drive mode shifting device for vehicles according to the present invention includes the casing that is mounted on the final decelerator along the substantially horizontal direction, and the communicating sections that are provided at two positions on the upper and the lower portions of the casing.

The two-wheel drive/four-wheel drive mode shifting device for vehicles according to the present invention include an injection for injecting an amount of a lubricant that is preset so that the engaging/disengaging member located at the lowest position out of the plurality of engaging/disengaging members is immersed in lubricant injected into the final decelerator and the shifting unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
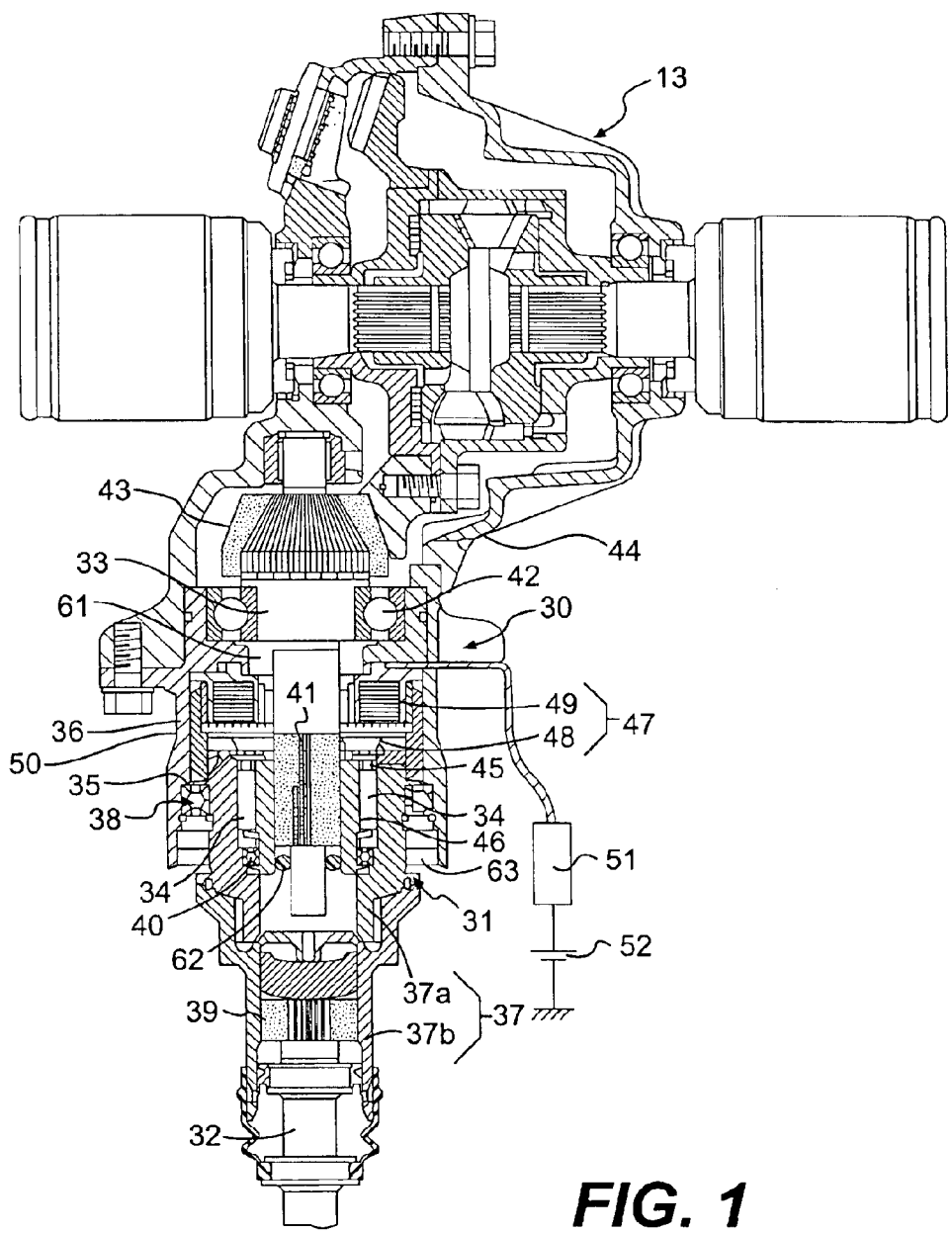
FIG. 1 is a sectional view showing one embodiment of the invention.
Figure 2:
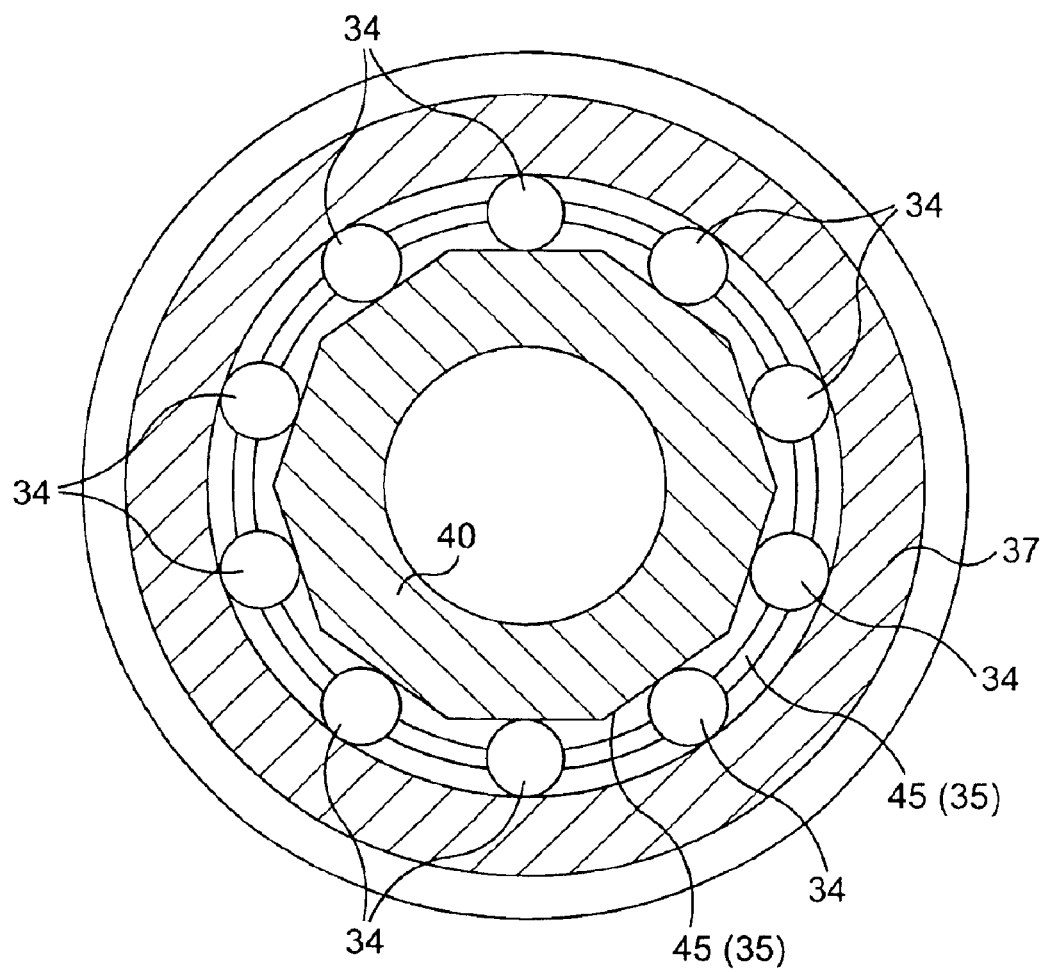
FIG. 2 is a longitudinal section showing the main part illustrating the embodiment of the invention.

Referring to FIGS. 1 to 3, one embodiment of the invention will be described below.

Figure 4:
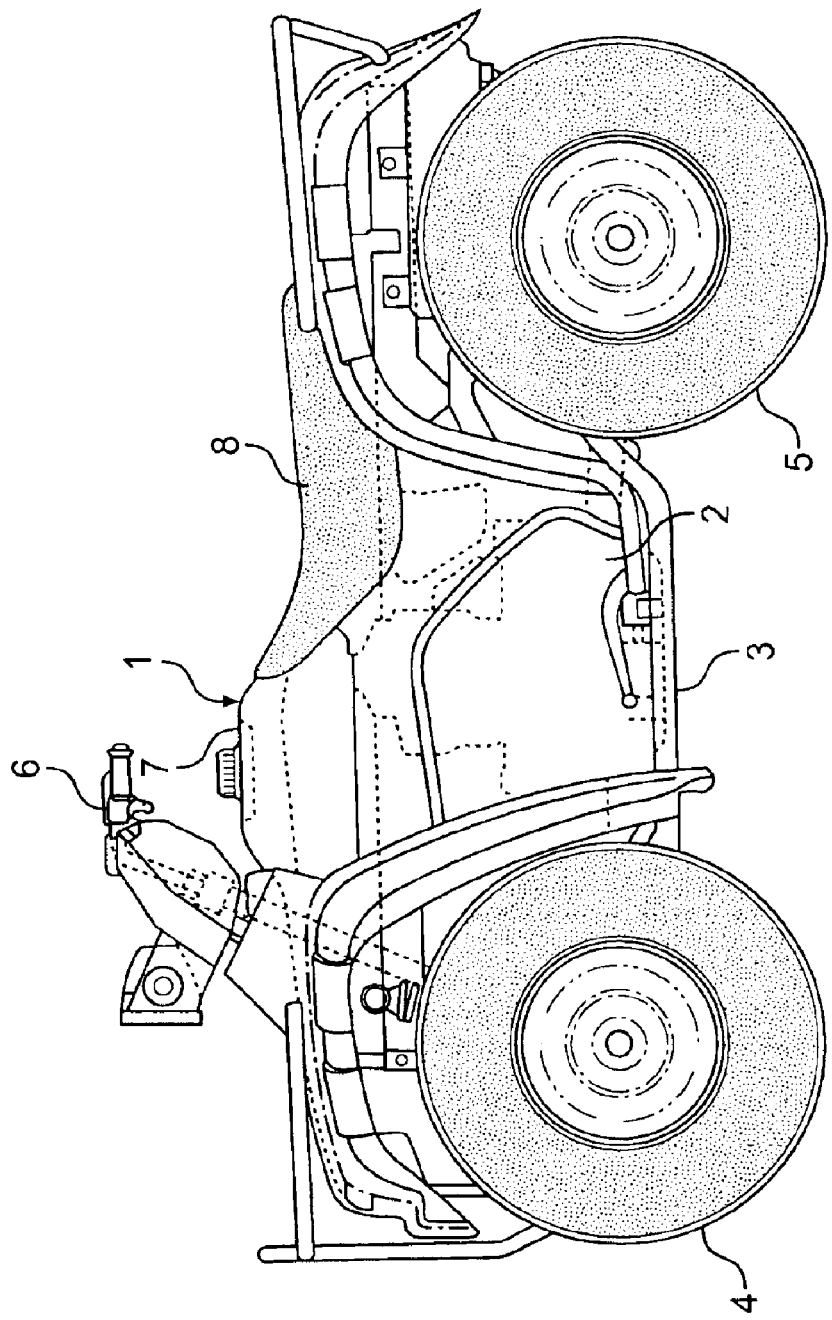
FIG. 4 is a side view showing an example of a vehicle provided with the two-wheel drive and four-wheel drive switching system.
Figure 5:
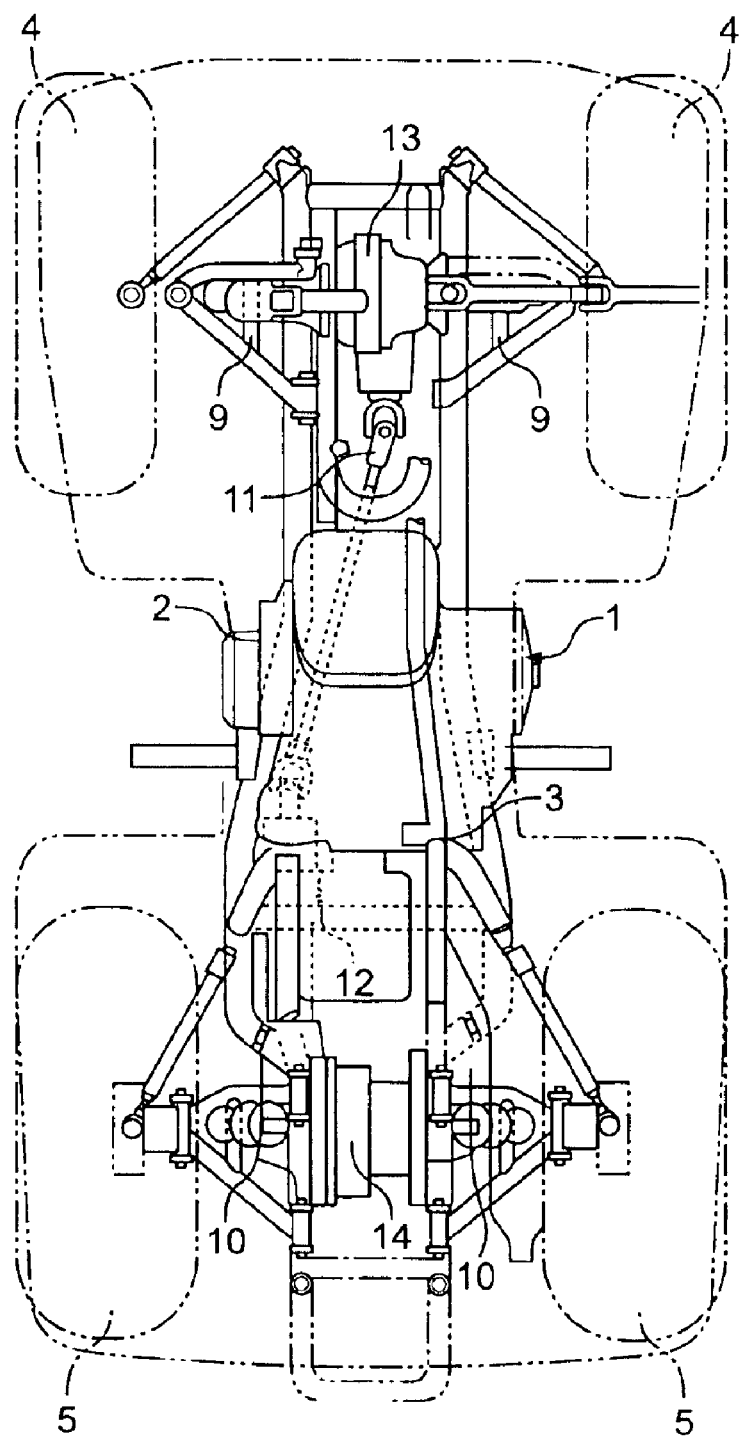
FIG. 5 is a plan view for explaining the body configuration of the vehicle.
Figure 6:
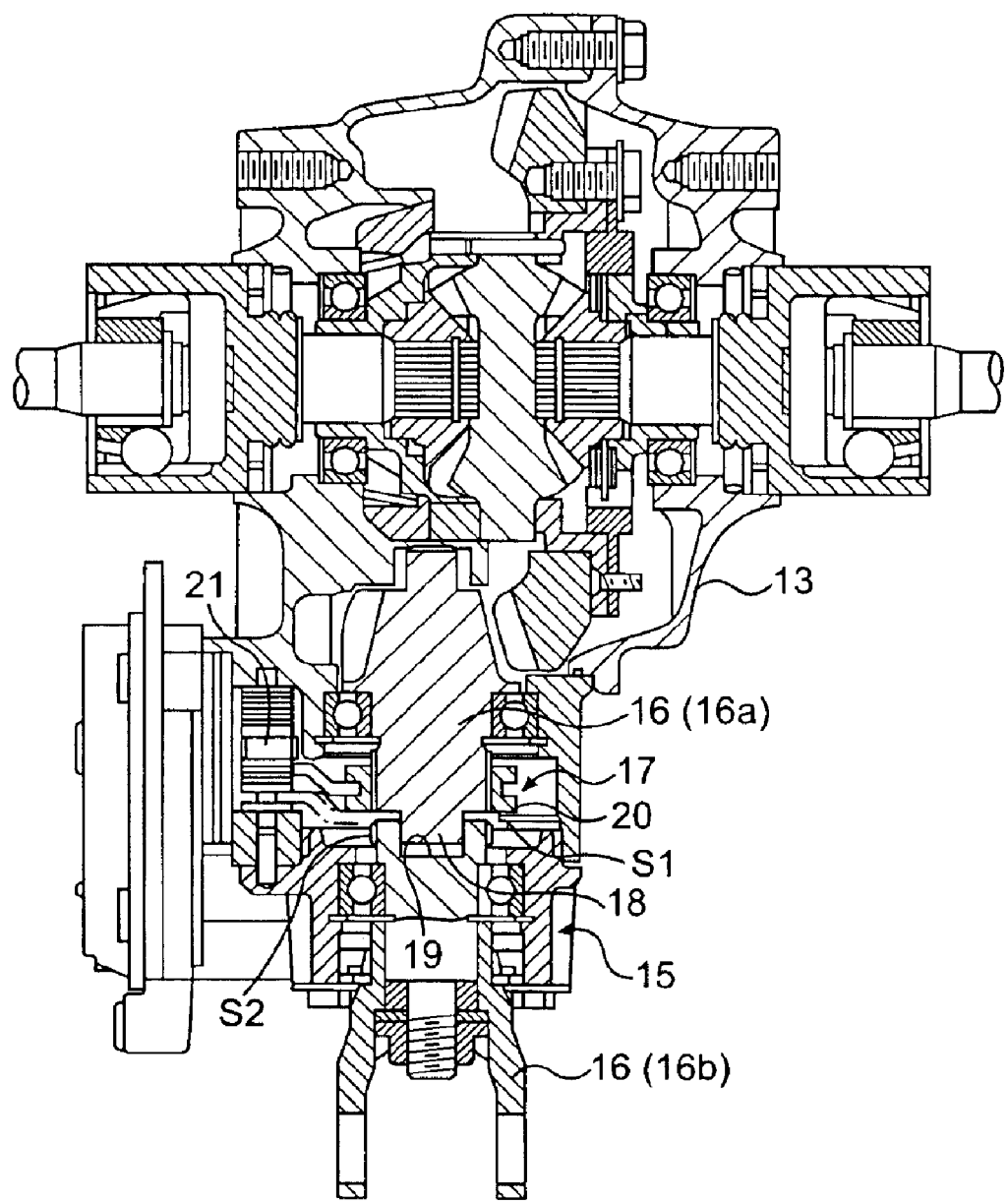
FIG. 6 is a sectional view showing the main part of one structural example of a conventional type two-wheel drive and four-wheel drive switching system.

As primary components of a vehicle are common to those in FIGS. 4 and 5 in the following description, the description is made using the same reference numbers and is simplified.

As illustrated in FIG. 1, a two-wheel drive and four-wheel drive switching system 30 (hereinafter called a drive switching system) is provided in a power transmission device provided between the front wheels 4 and an engine 2. The switching system 30 is formed by a switching unit 31 for transmitting power in the power transmission mechanism or disconnecting the transmission of power. The switching unit 31 is substantially composed of a driving shaft 32 connected to the drive side, a driven shaft 33 fitted to the driving shaft 32 via an annular clearance gap. A plurality of engaging/disengaging members 34 are provided in the clearance between the drive shaft 32 and driven shaft 33 for engaging or disengaging the drive shaft 32 and driven shaft 33 by being engaged or disengaged with the opposite faces. A switching mechanism 35 is provided for selectively positioning the engaging/disengaging members 34 in a position in which the drive shaft 32 and the driven shaft 33 are connected and in a position in which they are disconnected. A casing 36 is provided for surrounding these components.

Next, to describe the details of these, in this embodiment, a cylindrical outer ring 37 that protrudes on the side of the engine 2 is provided via a bearing 38 in the casing 36 so that the outer ring can be turned.

This outer ring 37 is axially divided into two halves in the axial direction and comprises a first outer ring 37a and a second outer ring 37b. The first outer ring and the second outer ring are connected via a spline 60 provided at the respective ends so that they can be integrally turned as a single unit.

A spline 39 is formed on the inner peripheral surface of the end on the side of the engine 2 of the second outer ring 37b. The driving shaft 32 and the second outer ring 37b are connected by inserting the driving shaft 32 into the second outer ring 37b so that the driving shaft and the spline 39 are engaged.

A cylindrical inner ring 40 is arranged inside the outer ring 37 via a circular interval of predetermined width between the inner ring and the inner surface of the outer ring 37.

A spline 41 is formed on the inner surface of the inner ring 40 and the driven shaft 33 inserted in the casing 36 is connected to the inner ring 40 via the spline 41.

An intermediate part in the longitudinal direction of the driven shaft 33 is supported by a bearing 42 attached to the casing 36 so that the intermediate part can be turned.

A bevel gear 43 is integrated with the end of the driven shaft 33 and is engaged with a ring gear 44 of the final reduction gear for the front wheels 13.

The plurality of engaging/disengaging members 34 forming a part of the switching unit 31 are, respectively, formed by a plurality of rollers arranged in parallel with the axis of the outer ring 37 as shown in FIGS. 1 and 2. The switching mechanism 35 is composed of a retainer 45 holding the engaging/disengaging member 34 so that it can be turned and mounted on the outer ring 37 so that the retainer can be relatively turned (can be relatively moved around the axis). A cam 46 is formed on the surface of the inner ring 40 for moving the engaging/disengaging member 34 in the radial direction in association with the relative movement with regard to the retainer 45.

An electromagnetic clutch 47 that forms the switching mechanism 35 for fixing or disengaging the retainer 45 and the outer ring 37 is provided at the end located inside the casing 36 of the outer ring 37.

This electromagnetic clutch 47 is composed of a clutch plate 48 provided between the retainer 45 and the outer ring 37 and an electromagnetic coil 49 for pressing or disengaging the clutch plate 48.

This electromagnetic coil 49 is brought into a connected state by exciting the clutch plate 48 and hereby, the retainer 45 and the outer ring 37 are fixed so that they cannot be relatively turned.

The electromagnetic coil 49 is formed annular, is housed in a housing 50 similarly formed in an annular shape. An iron core and the housing 50 are attached to the casing 36 by mounting the housing 50 on the casing 36 so that the housing surrounds the driven shaft 33.

The outer ring 37, the inner ring 40 and the switching mechanism 35 are built in the casing 36 into a unit. As shown in FIG. 1, in a state in which the driven shaft 33 is mounted, the casing 36 is attached to the final reduction gear for the front wheels 13 by being bolted on the case of the final reduction gear for the front wheels 13.

A control unit 51 for controlling turning it on or off and a power source 52 for supplying the driving power of the electromagnetic coil 49 are connected to the electromagnetic coil 49.

In the meantime, in this embodiment, an oil seal 61 for separating the switching mechanism 35 and the inside of the casing of the final reduction gear 13 is provided around the driven shaft 33 and between the bearing 42 and the switching mechanism 35. An oil seal 62 for shielding the inside of the switching unit 31 and space on the side of the driving shaft 32 is provided between the end of the driven shaft 33 and the inside of the end of the inner ring 40 for blocking the inside of the shifting unit 31 off the space on the side of the drive shaft 32.

The switching unit 31 is sealed by both oil seals 61 and 62 by the configuration as described above and is made independent of the other actuating part such as the final reduction gear 13. In this arrangement, the interior portions of the final decelerator 13 and the shifting unit 31 are brought into communication and each formed into a sealed construction.

Further, a dust seal 63 is provided between the first outer ring 37a and the inner peripheral surface of the end of the casing 36 so that clearance is sealed, dust and other articles are prevented from entering the casing 36. A fitting member 64 is fitted into the spline 60 of the second outer ring 37b fitted to the outer ring 37a and formed by a ring C for containing the axial relative movement that is provided relative to the first outer ring 37a.

A sealing ring 65 is provided in a part in which the first outer ring 37a and the second outer ring 37b are fitted.

Further, in this embodiment, the end of the driving shaft 32 is touched to the center of the second outer ring 37b, a positioning part 66 for positioning the driving shaft 32 is formed and a vent hole 67 is formed in the center of the positioning part 66.

The drive switching system 30 according to this embodiment and configured as described above disconnects the supply of current to the electromagnetic coil 49 to release the transmission of the driving force to the front wheels 4 and releases the fixation of the retainer 45 and the outer ring 37 by the electromagnetic clutch 47.

Figure 3A:
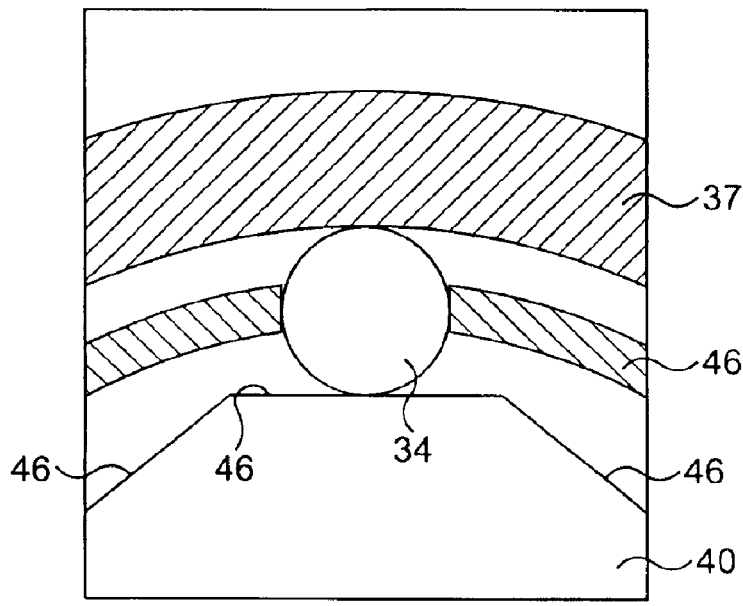
FIG. 3 is an enlarged sectional view showing the main part for explaining the operation of a drive switching system of the invention.

As shown in FIG. 3A, the engaging/disengaging member 34 is moved to the position on the bottom of the cam 46 and is held in a position apart from the outer ring 37.

As a result, the outer ring 37 and the inner ring 40 are disconnected, the turning of the driving shaft 32 is prevented from being transmitted to the driven shaft 33 and the drive of the front wheels 4 is stopped.

To realize four-wheel drive, the retainer 45 is fixed to the outer ring 37 by supplying current to the electromagnetic coil 49 and connecting the electromagnetic clutch 47.

Figure 3B:
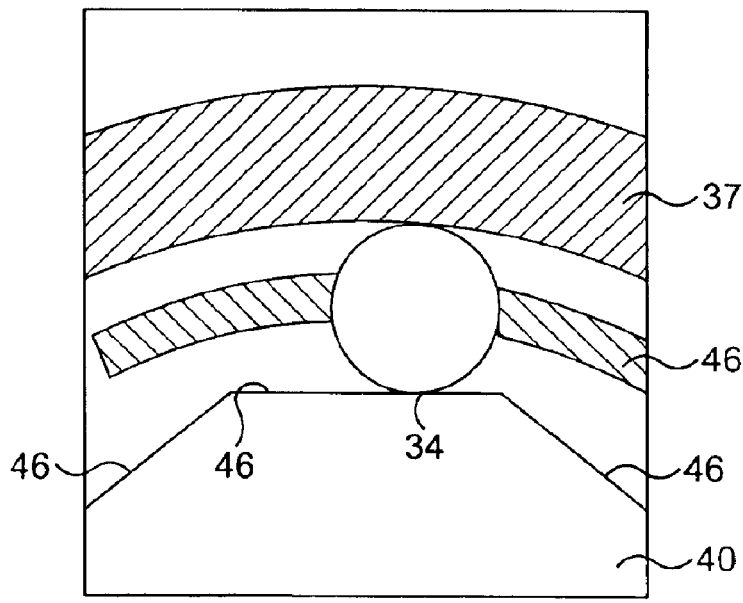

The engaging/disengaging member 34 held by the retainer 45 is moved together with the outer ring 37, as shown in FIG. 3B, is moved to the position of the top of the cam 46 formed on the inner ring 40 and is touched to the inner surface of the outer ring 37.

As a result, the outer ring 37 and the inner ring 40 are connected via the engaging/disengaging member 34, hereby, the driving shaft 32 and the driven shaft 33 are connected. Turning of the driving shaft 32 is transmitted to the driven shaft 33 and the drive of the front wheels 4 is started.

In the drive switching system 30 equivalent to this embodiment and configured as described above, as the engaging/disengaging member 34 is brought into a state in which power can be transmitted by being put between the outer ring 37 and the inner ring 40, the percussive sound is extremely small and as a result, the generation of noise in switching the types of drive can be inhibited.

As the switching unit 31 is united and can be mounted by fixing the switching unit 31 to the final reduction gear for the front wheels 13, it can be built without a large rearranging of existing structure.

The driving shaft 32 and the driven shaft 33 can be connected and disconnected even if there is difference in peripheral speed between the front wheel 4 and the rear wheel 5. Therefore, it is not necessary to provide a complex auxiliary mechanism such as a synchronization mechanism, the configuration is also simplified.

In this embodiment, the drive switching system 30 is sealed by both oil seals 61 and 62 and hereby, the drive switching system 30 can be individually lubricated by lube oil different from the other actuating part. In this embodiment, communication between the drive mode switching system 30 and the final decelerator 13 via the communicating section 61 enables circulation of lubricant between these members for lubricating them.

Therefore, the drive switching system 30 can be lubricated by an optimum lubricating method (for example, lubrication by grease) and the function can be sufficiently secured. Accordingly, lubrication between the drive mode switching system 30 and the final decelerator 13 can be performed by common lubricant, which results in simplification of the lubricating construction.

Further, as the dust seal 63 for sealing the end of the casing 36 is provided between the casing 36 forming the drive switching system 30 and the outer ring 37 inserted into the casing 36 from the end, dust and water are prevented from entering the casing 36. The soundness of the drive switching system 30 can be secured. The sealing performance of the drive switching system 30 is further enhanced and the independence of lubrication can be secured.

In case the drive switching system is applied to a different type of vehicle, the change of the form of the driving shaft 32 is enabled by changing the form of the second outer ring 37b, as a result, the change is promptly enabled by a small structural change and the flexibility of the system is greatly improved.

As an opening is secured in a position close to the mechanism of the switching unit 31 in assembling because the outer ring 37 is axially divided into two, the assembly of the mechanism is facilitated.

The form and the dimension of each component in the embodiment are an example and can be variously changed according to the requirement of design.

In this embodiment, communication between the drive mode shifting device 30 and the final decelerator 13 via the communicating section 61 enables circulation of lubricant between these members for lubricating them.

Accordingly, lubrication between the drive mode shifting device 30 and the final decelerator 13 can be performed by common lubricant, which results in simplification of the lubricating construction.

In addition, the provision of the dust seal 63 for closing the end of the casing 36 between the casing 36 that constitutes a drive mode shifting device 30 and the outer ring 37 to be inserted into the casing 36 from the end thereof which prevents dust, water, or the like from entering into the casing 36, thereby ensuring the structural integrity of the drive mode shifting device 30 and the final decelerator 13.

The configurations, dimensions and the like of each component in this embodiment are to be taken as an example, and thus various modifications are possible according to the design requirements and the like.

Figure 7:
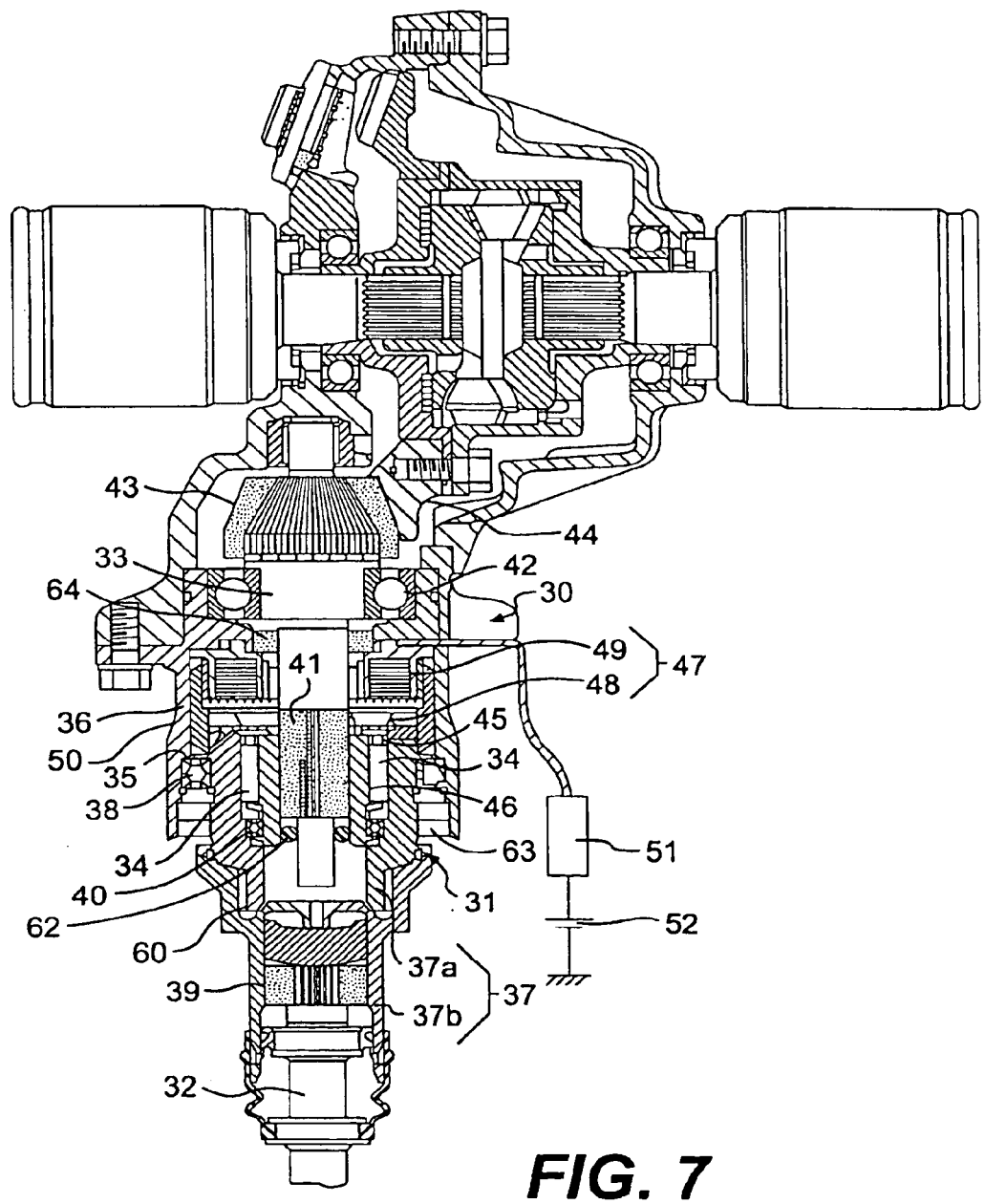
FIG. 7 is a cross-sectional view showing another embodiment of the present invention.

For example, the communicating section 61 shown in the above-described embodiment may be provided with an oil filter 64 as shown in FIG. 7.

In this arrangement, dirt, cutting chips, or the like produced at the drive mode shifting device 30 and the final decelerator 13 are prevented from being circulated with lubricant, thereby preventing deterioration of lubricant.

For example, the communicating section 61 shown in the above-described embodiment may be provided with an oil filter 64 as shown in FIG. 7.

Figure 8:
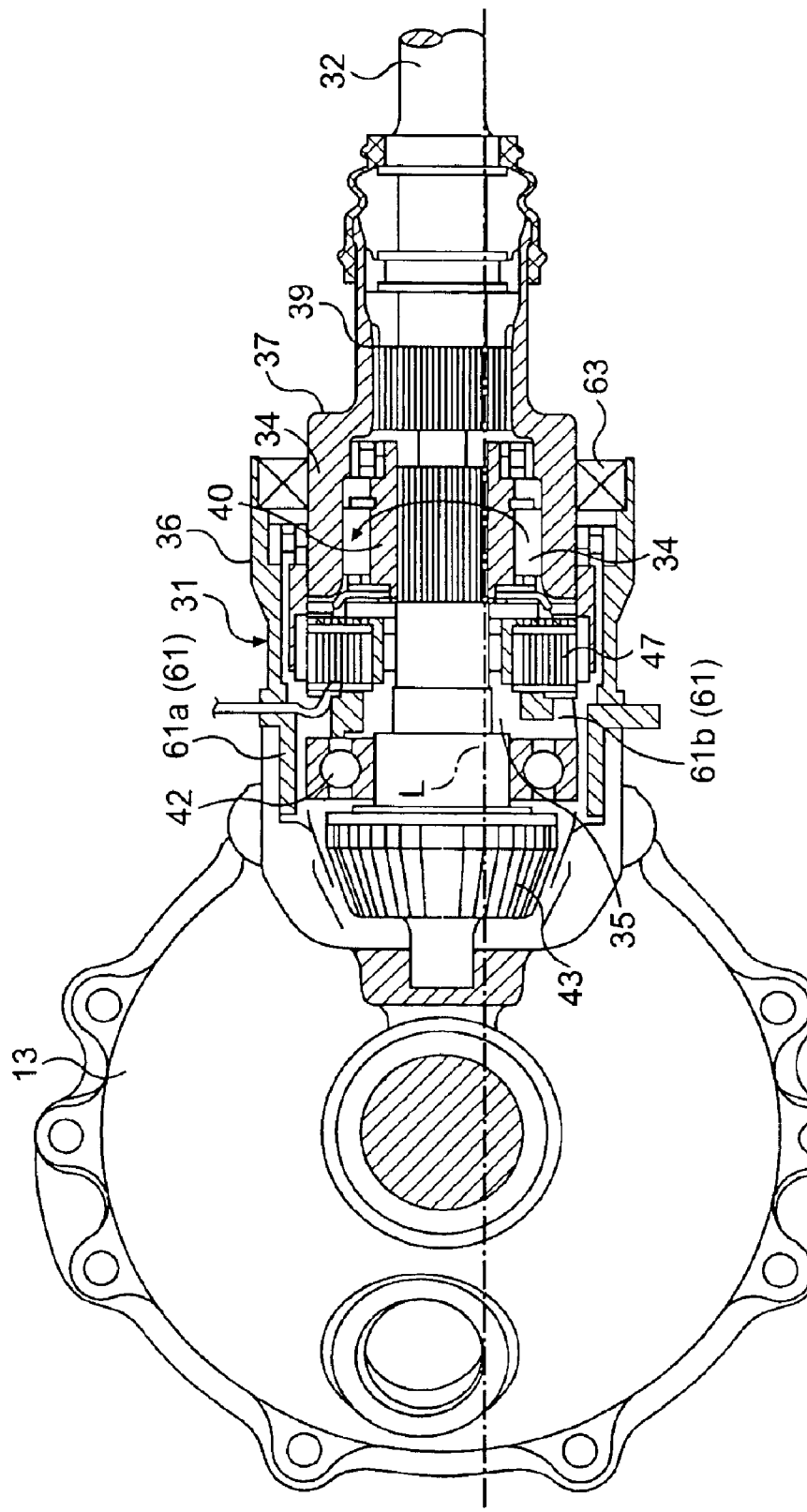
FIG. 8 is a longitudinal cross-sectional view showing a further embodiment of the present invention.
Figure 9:
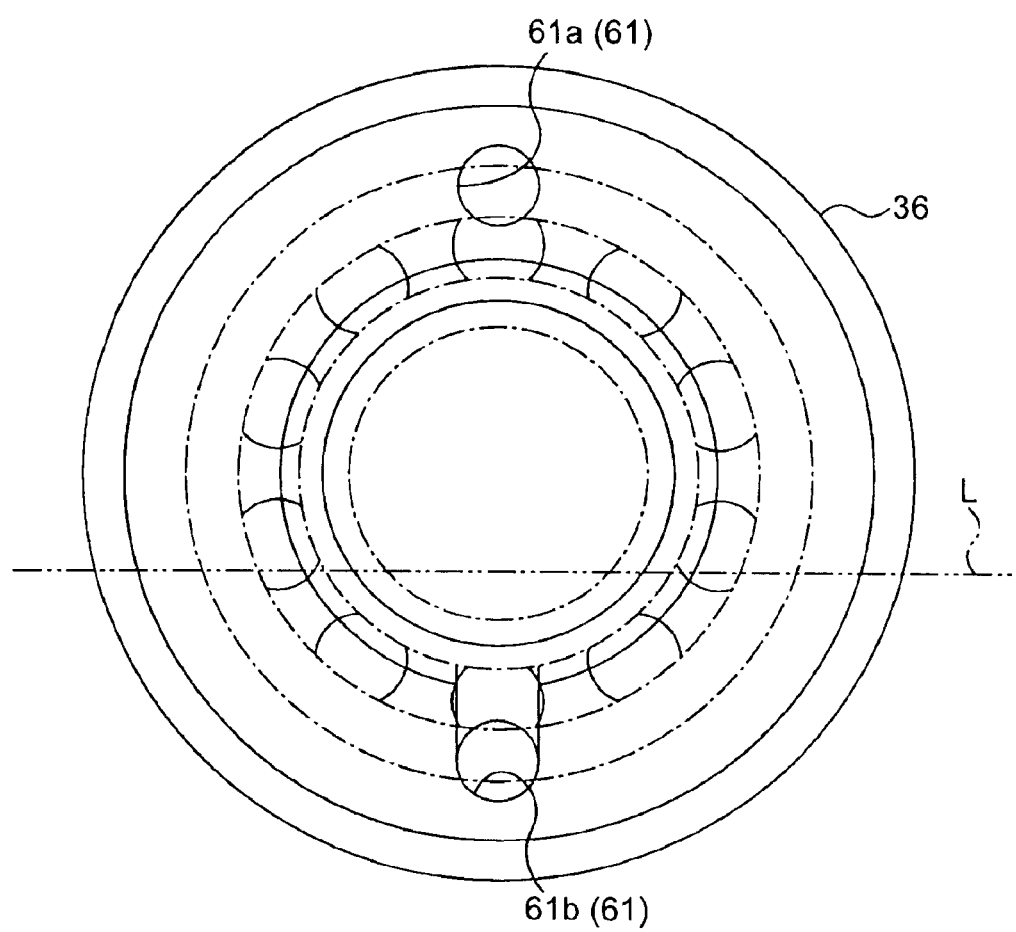
FIG. 9 is a lateral cross section of the principal portion of the embodiment as illustrated in FIG. 8.

As shown in FIG. 8 and FIG. 9, it is also possible to mount the casing 36 to the final decelerator 13 along a substantially horizontal direction, and to provide the communicating sections 61 at two positions (61a, 61b) on the upper and lower portions of the casing 36.

Then, as shown in FIG. 8, the injection amount of lubricant is preset so that the liquid surface L of lubricant injected into the final decelerator 13 and the shifting unit 31 comes above the engaging/disengaging member 34 at the lowest position of the plurality of engaging/disengaging members 34.

In this arrangement, the lubricant is scraped upward by the upward movement of the engaging/disengaging member 34 along with the rotation of the outer ring 37 during driving of the vehicle, and thus the lubricant is uniformly dispersed to lubricate the engaging/disengaging member 34 or the engaged portion between the inner ring 40 and the outer ring 37 smoothly, and the shifting mechanism 35 can be cooled effectively.

The lubricant that is scraped upward is, as shown by an arrow in FIG. 8, returned from the upper communication section 61a to the final decelerator 13.

As described above, according to the present invention, as the drive shaft and the driven shaft are fitted to be connected or disconnected by the engaging/disengaging member provided between the drive shaft and the driven shaft, they can be smoothly connected or disconnected even if there is difference in rotational speed between them.

Therefore, no complex auxiliary mechanism such as a synchronization mechanism that is required to be provided and the drive switching system according to the invention can have a simple structure.

Percussive noise at the time of connection and disconnection can be inhibited and as a result, the generation of noise in switching between the types of drive can be inhibited.

As the switching unit can be mounted by uniting the switching unit and fixing it to the existing structure of the final reduction gear, it can be built without a large change of the existing structure.

In the meantime, in an application to a different type, the change of the form of the connected driving shaft is enabled by changing the form of the second outer ring, as a result, is promptly enabled by a small structural change and the flexibility is greatly improved.

As an opening is secured in a position close to the mechanism of the switching unit in assembling because the outer ring is axially divided into two, the assembly of the mechanism is facilitated.

Allowing the drive mode switching device and the final decelerator to communicate with each other via the communicating section enables lubrication with common lubricant, which results in simplification of the lubricating construction.

In addition, the provision of the oil filter at the communicating section prevents circulation of dirt, cutting chips, or the like produced at the drive mode shifting device and the final decelerator together with lubricant, thereby preventing deterioration of lubricant.

Furthermore, providing a dust seal at the opening of the end portion of the casing that constitutes the shifting unit prevents dust, water or the like from entering into the shifting unit, thereby ensuring the structural integrity thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel drive/four-wheel drive mode shifting device for vehicles comprising:

a shifting unit provided on one power transmission mechanism provided, respectively, between an engine and front wheels and between the engine and rear wheels for connecting and disconnecting transmission of power in the power transmission mechanism;

a drive shaft connected to driving means;

a driven shaft fitted to the drive shaft with an annular clearance defined therebetween;

a plurality of engaging/disengaging members interposed in the clearance between the drive shaft and the driven shaft for connecting and disconnecting the drive shaft and the driven shaft by being engaged and disengaged with opposed surfaces;

a shifting mechanism for selectively placing the engaging/disengaging members between the position to connect the drive shaft and the driven shaft and the position to disconnect the same;

a casing for enclosing the shifting unit, the drive shaft, the driven shaft, the plurality of engaging/disengaging members and the shifting mechanism;

wherein the casing is mounted on a final decelerator connected to the driven shaft, a communicating section that brings the casing and the final decelerator into communication with each other, and an oil seal is provided on the opposite side of the driven shaft from the portion formed with a communicating section; and an oil filter being formed at the communicating section between the casing and the final decelerator.

2. The two-wheel drive/four-wheel drive mode shifting device for vehicles according to claim 1, wherein the casing is mounted on the final decelerator along the substantially horizontal direction, and the communicating section is provided at two positions on the upper and the lower portions of the casing.

3. The two-wheel drive/four-wheel drive mode shifting device for vehicles according to claim 1, wherein an injection amount of a lubricant is preset so that the engaging/disengaging member at the lowest position out of the plurality of engaging/disengaging members is immersed in the lubricant injected into the final decelerator and the shifting unit.

4. The two-wheel drive/four-wheel drive mode shifting device for vehicles according to claim 2, wherein an injection amount of a lubricant is preset so that the engaging/disengaging member at the lowest position out of the plurality of engaging/disengaging members is immersed in the lubricant injected into the final decelerator and the shifting unit.

* * * * *